United States Patent [19]

Abdulally

[11] Patent Number: 5,567,228
[45] Date of Patent: Oct. 22, 1996

[54] SYSTEM FOR COOLING AND CLEANING SYNTHESIZED GAS USING AHOT GRAVEL BED

[75] Inventor: Iqbal F. Abdulally, Randolph, N.J.

[73] Assignee: Foster Wheeler Energy Corporation, Clinton, N.J.

[21] Appl. No.: 498,040

[22] Filed: Jul. 3, 1995

[51] Int. Cl.⁶ .................................................. B01D 53/12
[52] U.S. Cl. ................... 95/109; 95/110; 95/115; 95/135; 96/123; 96/126; 96/130; 96/150; 55/318; 55/340; 422/142; 422/144; 422/146; 422/147; 422/235; 423/244.01
[58] Field of Search .......................... 95/107–110, 114, 95/115, 135–137; 96/123, 126, 130, 132, 134, 136, 138, 143, 150; 55/315, 318, 338, 340; 422/142–147, 198, 213, 233, 235; 423/244.01, 244.08

[56] References Cited

U.S. PATENT DOCUMENTS

| | | | |
|---|---|---|---|
| 2,636,574 | 4/1953 | Widdowson et al. ................... | 95/108 |
| 2,852,545 | 9/1958 | Jenny .................................. | 422/142 X |
| 2,960,388 | 11/1960 | Johnson et al. ...................... | 422/142 X |
| 3,816,554 | 6/1974 | Reni et al. .......................... | 422/143 X |
| 3,902,856 | 9/1975 | Burroughs et al. .................. | 422/142 X |
| 3,977,846 | 8/1976 | Russell et al. ...................... | 55/79 |
| 4,120,668 | 10/1978 | Fraley ................................ | 55/72 |
| 4,917,875 | 4/1990 | Moore et al. ........................ | 95/107 X |
| 5,019,137 | 5/1991 | Ruottu ............................... | 55/73 |
| 5,021,222 | 6/1991 | Owen ................................. | 422/144 |
| 5,037,617 | 8/1991 | Soni .................................. | 422/142 |
| 5,110,775 | 5/1992 | Owen ................................. | 422/144 X |
| 5,205,350 | 4/1993 | Hirsch et al. ...................... | 165/104.18 |
| 5,242,662 | 9/1993 | Toth .................................. | 422/142 |
| 5,286,691 | 2/1994 | Harandi et al. .................... | 422/144 X |
| 5,299,532 | 4/1994 | Dietz ................................ | 422/142 X |
| 5,332,553 | 7/1994 | Hyppanen .......................... | 422/142 X |
| 5,463,968 | 11/1995 | Abdulally .......................... | 422/146 X |
| 5,464,597 | 11/1995 | Tang .................................. | 95/108 X |

FOREIGN PATENT DOCUMENTS

| | | | |
|---|---|---|---|
| 0100812 | 2/1984 | European Pat. Off. ................ | 95/135 |
| 53-130575 | 11/1978 | Japan ................................ | 95/110 |
| 59-136121 | 8/1984 | Japan ................................ | 95/137 |
| WO88/08741 | 11/1988 | WIPO . | |

Primary Examiner—Robert Spitzer
Attorney, Agent, or Firm—Haynes and Boone, L.L.P.

[57] ABSTRACT

A method and apparatus for treating synthesized gas ("syngas") comprises introducing the syngas into a lower portion of a vessel. The syngas flows in the lower portion through a static regenerative hot gravel bed and into an upper portion of the vessel containing particulate material at a temperature less than that of the syngas in a manner so that the material reduces the temperature of the syngas and reacts with the syngas to abate pollutants therein, and the syngas entrains at least a portion of the material. The entrained material is then separated from the gas, cooled in a heat exchanger, and returned to the vessel, while the separated syngas is passed to downstream facilities.

40 Claims, 1 Drawing Sheet

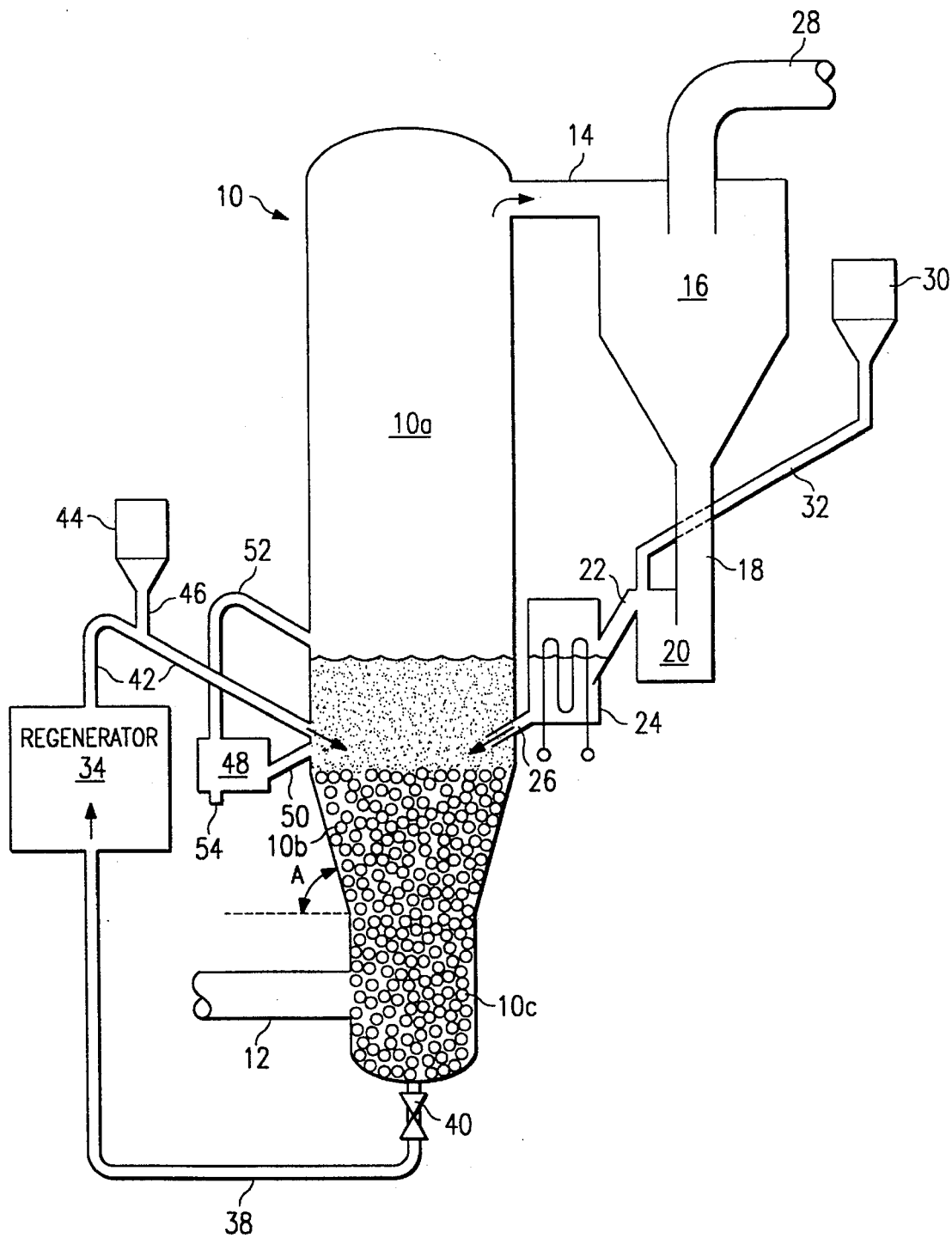

SYSTEM FOR COOLING AND CLEANING SYNTHESIZED GAS USING A HOT GRAVEL BED

BACKGROUND OF THE INVENTION

This invention relates to a method and apparatus for cleaning and cooling high temperature corrosive synthesized gas and, more particularly, to such a method and apparatus utilizing a static regenerative hot gravel bed, and a fluidized bed of fine particles which is recirculated through a heat exchanger.

Several well-known techniques, such as the gasification of coal, are available for producing synthesized gas (hereinafter referred to as "syngas") which may be passed to a topping combustor and a gas turbine, or the like, for an integrated gas combined cycle (IGCC) system and second generation pressurized circulating fluidized bed (PCSB), or, alternatively, for use in chemical processes wherein synthetic hydrocarbons are manufactured. However, the syngas so produced often contains a relatively high quantity of corrosive gaseous species and acid pollutants, such as CO, HCl, $NH_3$, $H_2S$ and sulphur constituents generally, and, to a lesser extent, other corrosive gaseous species, alkali particles, and hydrocarbons (hereinafter referred to as "pollutants") which must be removed to comply with federal and state emissions standards.

Such pollutants are typically removed using a metal regenerative process in which pollutants in the syngas react with metal and are then regenerated producing elemental sulphur and chlorine. To enhance this pollutant removal process, the syngas is often initially cooled from temperatures which may exceed 2600° F. This cooling may be effected using a conventional tube and shell heat exchanger arranged to be either convective or radiant. In a convective (or "fired tube") arrangement, syngas is passed through the tubes and a cooling medium (such as water) is passed through the shell around the tubes. Alternatively, in a radiant arrangement, syngas is passed through the shell and a cooling medium is passed through the tubes. A disadvantage with either method though is that each is prone to corrosion and pluggage caused by the presence of corrosive gases and a low melt eutectic of inorganic compounds.

Alternatively, syngas may be cooled and pollutants removed therefrom using a system incorporating a circulating fluidized bed with a spouting bed. This method calls for mixing and reacting syngas with fresh sorbent and a cooled recycle stream of sorbent. A disadvantage of this method is that it utilizes a grid, which is typically water-cooled, resulting in the condensation of acid gases which may then plug nozzles in the grid.

SUMMARY OF THE INVENTION

It is therefore an object of the present invention to provide a syngas treatment method and apparatus which, utilizes a static hot gravel bed through which syngas is uniformly distributed with a minimum of pluggage.

It is a further object of the present invention to provide a method and apparatus of the above type in which the gravel bed may be continuously regenerated.

It is a further object of the present invention to provide a method and apparatus of the above type which utilizes a sorbent to absorb, and thereby remove, sulfur and/or other corrosive constituents from the syngas.

It is a further object of the present invention to provide a method and apparatus of the above type in which the temperature of the syngas is reduced to a level which is compatible for introduction into a topping combustor and a gas turbine and which is consistent with the absorption by the sorbent of the pollutants in the syngas.

It is a further object of the present invention to provide a method and apparatus of the above type which utilizes a fluidized bed of entrained particulate material formed in a vessel.

It is a further object of the present invention to provide a method and apparatus of the above type in which the syngas discharges from the vessel and is separated from the entrained particles, and in which the latter particles are cooled in a heat exchanger and returned to the vessel.

It is a further object of the present invention to provide a method and apparatus of the above type in which the separated syngas is introduced to a topping combustor and a gas turbine.

Towards the fulfillment of these and other objects, the method and apparatus of the present invention features the cooling of relatively high temperature syngas and the removal of pollutants therefrom. According to the present invention, the syngas is introduced into the lower portion of a vessel. The syngas then flows in the lower portion through a static regenerative hot gravel bed and into an upper portion of the vessel containing pollutant-absorbing particulate material at a temperature less than that of the syngas in a manner so that the syngas entrains at least a portion of the material and so that the material reduces the temperature of, and absorbs, thereby removing, pollutants from, the syngas. The entrained material is then separated from the syngas, cooled in a heat exchanger, and returned to the vessel, while the separated, and cleaned, syngas is passed to downstream facilities.

BRIEF DESCRIPTION OF THE DRAWINGS

The above brief description as well as further objects, features and advantages of the method of the present invention will be more fully appreciated by reference to the following detailed description of presently preferred but nonetheless illustrative embodiments in accordance with the present invention when taken in conjunction with the accompanying drawing which is a schematic representation of the apparatus of the present invention.

DESCRIPTION OF THE PREFERRED EMBODIMENTS

Referring to the drawing, the reference numeral 10 refers, in general, to a vessel having an upper cylindrical section 10a, an intermediate frustoconical section 10b, and a lower cylindrical section 10c, of a lesser diameter than the upper section 10a. The wall of the frustoconical section 10b forms an angle A of between 75° and 90° from a horizontal plane. A horizontally-extending inlet duct 12 registers with a corresponding opening formed in the wall of the lower cylindrical section 10c, which opening includes a retaining screen or cross-bars (not shown) to retain gravel material (to be described).

A duct 14 registers with an opening formed through the upper cylindrical vessel section 10a and connects the vessel 10 with a cyclone separator 16 disposed adjacent the vessel. A dipleg 18 connects the lower portion of the separator 16 with a pressure seal, in the form of a J-valve 20, which, in turn, is connected, via a duct 22, to a heat exchanger 24. A duct 26 connects an outlet opening formed in the lower portion of the heat exchanger 24 to the vessel 10 via an opening formed in the wall of the lower portion of the upper vessel section 10a. A syngas outlet duct 28 extends from the interior of the separator 16 to downstream equipment such as a topping combustor and a gas turbine (not shown). A sorbent storage/transfer bin 30 is located adjacent the separator 16 and has an outlet connected, via a duct 32, to the top of the J-valve 20.

A gravel regenerator 34 is located adjacent the vessel 10 for regenerating gravel material. A duct 38 connects an inlet of the regenerator 34 to a valve 40 which in turn connects to an outlet opening extending vertically through the bottom end of the lower cylindrical vessel section 10c. A duct 42 connects an outlet of the regenerator 34 to an inlet opening extending through the wall of the lower portion of the upper cylindrical vessel section 10a. A gravel storage/transfer bin 44 is located adjacent the vessel 10 and has an outlet connected, via a duct 46, to the duct 42.

A conventional fluidized bed oxidizer/cooler 48 is located adjacent the vessel 10 for oxidizing and cooling spent fluidized bed materials. A duct 50 connects an outlet opening extending through the wall of the lower portion of the upper vessel section 10a to an inlet of the oxidizer/cooler 48. A duct 52 connects an outlet of the oxidizer/cooler 48 to an inlet opening extending through the wall of the upper vessel section 10a above the duct 50. The oxidizer/cooler 48 is also provided with a outlet drain 54 extending through the bottom of the oxidizer/cooler.

In operation, gravel material comprising fused silica or an equivalent which is resistant to temperatures as high as 2400° F., is loaded into the bin 44. The gravel material is transferred from the bin 44 through the ducts 46 and 42 into the vessel 10 where it accumulates and forms, in the lower and intermediate vessel sections 10c, 10b, a gravel bed. Quenched (i.e., nonstoichiometric) air is then heated to a temperature of up to 2000° F. by an induct burner (not shown) and passed through the inlet duct 12 into the lower vessel section 10c to heat the gravel bed to a temperature of between 1600° and 2000° F.

Relatively fine sorbent material, such as limestone or dolomite, stored in the sorbent bin 30 is then transferred via the duct 32, the J-valve 20, the duct 22, the heat exchanger 24, and the duct 26, into the vessel section 10a atop the gravel bed.

After the gravel bed is formed and heated and sorbent is transferred to the vessel 10, syngas, under reducing conditions at an elevated temperature typically in excess of 2000° F. and containing sulfur and other pollutants, is transferred from an upstream production facility and introduced into the vessel 10 via the inlet duct 12.

The velocity of the syngas introduced into the vessel 10 is controlled so that the "solids" (i.e., all nongaseous material, including sorbent and excluding gravel, in the vessel 10) behave as a fluidized bed. It is understood that the gravel is sized (e.g., at 0.5 to 1 inch diameter) so that it will not fluidize at the velocity of the syngas flowing through the gravel bed. The gravel bed helps to evenly distribute the syngas across the cross section of the vessel, so that mixing and absorption of pollutants by the sorbent in the fluidized bed are optimized. As a result of the fluidization, the syngas and a portion of the entrained solids pass upwardly through the vessel 10 and exit through the opening in the upper vessel section 10a and into the duct 14. The separator 16 receives the syngas, with the entrained solids, from the duct 14 and operates to separate the former from the latter by cyclone separation in a conventional manner. The separated syngas in the separator 16 passes through the duct 28 to further processes, such as a fine particle removal filter and/or a topping combustor and a gas turbine (none of which are shown).

The separated solids from the separator 16 pass, via the dipleg 18, to the J-valve 22 which operates in a conventional manner to establish a pressure seal between the separator 16 and the heat exchanger 24 to prevent the material contained in the vessel 10 from backflowing through the heat exchanger to the separator.

A fresh supply of sorbent particles from the bin 30 passes into the J-valve 20 via the duct 32 and combines with the separated solids in the J-valve before the mixture of solids passes into the heat exchanger 24. The heat exchanger 24 is of a conventional design and, as such, includes heat exchange surfaces through which a cooling fluid is passed to remove heat from the mixture of solids thereby cooling the mixture down to approximately 1000° F. before the mixture passes into the vessel 10.

The fluidized bed oxidizer/cooler 48 receives, via the duct 50, spent solids materials from the fluidized bed atop the gravel bed. The oxidizer/cooler 48 operates in a conventional manner to cool the solids and oxidize sulfur captured by the sorbent. For example, given a limestone-based sorbent, the oxidizer/cooler 48 will convert toxic non-disposable calcium sulfide (CaS) into non-toxic disposable calcium sulfate ($CaSO_4$). The cooled and oxidized solids materials are then either returned to the vessel 10 via the duct 52 or are passed out of the system via the drain 54.

Solids may thus be added to the upper section 10a from the bin 30 and/or drained via the drain 54 and hence the height of the fluidized bed may thereby be controlled. By controlling the height of the fluidized bed, and also the freeboard differential pressure (i.e., the difference in the pressure between the top and the bottom of the freeboard, that is, the space in the vessel above the fluidized bed), the solids inventory and, hence, the solids residence time may also be controlled. Thus, for example, by maximizing the height of the fluidized bed, the solids residence time is increased and the sorbent has greater time to absorb more pollutants from the syngas.

As a result of the foregoing, the syngas is cooled in the vessel 10, by the cooled sorbent materials returned from the heat exchanger 24, to a temperature required for reaction of the sorbent with the corrosive gaseous species and other pollutants in the syngas which, for a limestone sorbent, is approximately 1600° F.

In addition to the foregoing, the gravel may be regenerated by transferring it from the vessel 10 to the regenerator 34 via the duct 38 at either a constant or an intermittent rate selectively controlled by the valve 40. The regenerator 34 is operative in a conventional manner for first agitating the gravel in a mill to dislodge deposits that adhere to the gravel and for then sorting and screening the gravel to remove undesirable gravel. Useable gravel is then recycled back to the vessel 10 via the duct 42. Fresh gravel may be transferred to the vessel 10 from the bin 44 via the ducts 46, 42 to replace removed gravel.

It is understood that if the syngas transferred from the upstream production facility has a temperature in excess of 2400° F., then the syngas should be cooled to less than 2400° F. before it enters the gravel bed. This may be achieved in a conventional manner, for example, by replacing a portion of the inlet duct 12 with a cooled enclosure duct.

Several advantages result from the foregoing. For example, because the gravel material in the gravel bed is run hot, there is little or no heat transfer (loss) from the syngas to the gravel, and hence, there is minimal opportunity for molten solids to condense on the surface of the gravel. Moreover, if the molten solids do deposit on the gravel, they will, for the most part, remain molten and trickle down to the bottom end of the vessel 10 where they may be discharged using an appropriate removal system. In contrast, a cooled grid in a typical circulating fluidized bed system bed is prone to condensation and deposition of solids which may block nozzles in the grid, thereby reducing the effectiveness of the grid.

Further advantages result from using a static gravel bed instead of a grid because, by passing syngas through a gravel bed, the syngas is more uniformly distributed and mixed with the sorbent material thereby resulting in greater acid gas abatement.

Further advantages result from using a fluidized bed because the gravel particle size distribution according to the present invention is narrower than the sorbent particle size distribution in a spouting bed design, thereby facilitating an even and vigorous fluidization and mixing of the solids and syngas, and further reducing the agglomeration of the solids.

Further advantages result from using a gravel bed because the gravel may be continuously regenerated, rather than just during a unit shut-down as required when regenerating a grid system. Therefore, maintenance is simplified and unit shut-down time is reduced.

Further advantages result from using the static gravel bed because the free fluid flow area through the gravel bed between the gravel particles is small, relative to the duct 12 and the freeboard space in the upper vessel section 10a. As a consequence, the inter-particulate velocity of the syngas, and the solids entrained therein, flowing between the gravel particles is relatively high, e.g., greater than 50 ft/sec, thereby keeping the solids entrained in the syngas and further alleviating the deposition of solids on the gravel.

Further advantages result from using a circulating fluidized bed design and passing the recycled solids through the heat exchanger 24 to cool the recycled solids which in turn cools the syngas, thereby circumventing the need for conventional tube and shell heat exchangers which are prone to corrosion and pluggage caused by the presence of corrosive gases in the syngas.

Further advantages result from using the oxidizer/cooler 48 because it not only converts toxic, nondisposable CaS to non-toxic, disposable CaSO$_4$, but, together with the bin 30, also allows for flexible control of the solids residence time in the vessel 10.

A latitude of modification, change and substitution is intended in the foregoing disclosure and in some instances some features of the invention will be employed without a corresponding use of other features. Accordingly, it is appropriate that the appended claims be construed broadly and in a manner consistent with the scope of the invention.

What is claimed is:

1. A method for treating gas comprising the steps of
passing the gas into a vessel containing a static gravel bed, which bed distributes the gas and supports a fluidized bed of relatively fine particulate material, the material being at a temperature less than that of the gas so that the material reduces the temperature of the gas and the gas entrains at least a portion of the material;
separating the entrained material from the gas;
cooling the separated material; and returning the cooled separated material back to the vessel.

2. The method of claim 1 wherein the gravel is heated to a temperature in a manner so that condensation of the gases on the gravel is reduced.

3. The method of claim 2 further comprising the step of regenerating the gravel in a regenerator located externally of the vessel.

4. The method of claim 3 wherein the step of regenerating further comprises the steps of agitating the gravel in a mill to dislodge deposits adhering to the gravel and then sorting and screening the gravel to remove undesirable gravel.

5. The method claim 4 wherein the regenerating further comprises adding gravel to replace the removed gravel.

6. The method of claim 3 further comprising the step of cooling and oxidizing the material, and returning a portion of the material to the vessel.

7. The method of claim 2 further comprising the step of adding new material to the vessel.

8. The method of claim 1 wherein the material is a sorbent.

9. The method of claim 1 wherein the material is a sulphur-absorbing sorbent.

10. The method of claim 1 wherein the step of separating is effected in a cyclone separator located externally of the vessel.

11. The method claim 10 further comprising the steps of establishing a pressure seal between the vessel and the separator.

12. The method of claim 1 wherein the step of cooling the material comprises the step of passing the material through a heat exchanger.

13. A method for treating gas comprising the steps of:
passing the gas in a vessel through an inert static gravel bed and through a fluidized bed of particles supported by the gravel bed, the particles having a temperature less than that of the gas so that the gas is cooled, the gravel having a temperature comparable to the gas;
reacting the gas with the particles;
separating the particles from the gas;
cooling the separated particles in a heat exchanger;
returning the cooled separated particles to the vessel; and
regenerating the gravel.

14. The method of claim 13 wherein the particles are a sorbent.

15. The method of claim 13 wherein the step of separating is effected in a cyclone separator located externally of the vessel.

16. The method of claim 15 further comprising the step of establishing a pressure seal between the vessel and the separator to prevent the backflow of the particles to the separator.

17. The method of claim 16 wherein the gas contains sulfur, the particles are a sulphur-absorbing sorbent, and further comprising the steps of introducing fresh sulphur-absorbing sorbent to the pressure seal for mixing with the separated particles.

18. The method of claim 17 further comprising the step of passing the mixture through the heat exchanger and to the vessel.

19. The method of claim 13 wherein the step of regenerating is effected in a regenerator located externally of the vessel.

20. The method of claim 19 wherein the step of regenerating further comprises the steps of agitating the gravel in a mill to dislodge deposits adhering to the gravel and then sorting and screening the gravel to remove undesirable gravel.

21. The method claim 20 wherein the step of regenerating further comprises the steps of adding gravel to replace the removed gravel.

22. A method for treating sulfur-containing gas, comprising the steps of introducing a relative coarse inert particulate material into a vessel, introducing a relatively fine sorbent particulate material into the vessel, introducing the gas into the vessel, controlling the velocity of the gas so that it is sufficient to fluidize and entrain at least some of sorbent material and insufficient to fluidize and entrain the inert material, the gas and the entrained sorbent material passing from the vessel, separating the entrained material from the gas, passing the separated gas to external equipment, cooling the separated sorbent material, and returning the cooled separated sorbent material to the vessel where it cools the gas sufficiently to permit the sorbent material to adsorb the sulfur in the gas.

23. The method of claim 22 wherein the inert material is at a temperature less than that of the gas so that the inert material also cools the gas in the vessel.

24. The method of claim 22 further comprising the step of adding new sorbent material to the separated sorbent material, cooling the new sorbent material with the separated sorbent material and returning the new sorbent material with the separated sorbent material back to the vessel.

25. The method of claim 24 further comprising the steps of draining the sorbent material from the vessel, and controlling the step of adding and the step of draining to control the height of the sorbent material in the vessel and therefore the residence time of the sorbent material in the vessel.

26. The method of claim 22 further comprising the step of heating the inert material in the vessel before the third step of introducing.

27. The method of claim 22 wherein the step of heating comprises the step of introducing heated air into the vessel in a heat exchange relation with the inert material.

28. The method of claim 22 wherein the gas is introduced into the vessel at a temperature exceeding 2000 degrees F., and wherein the temperature of the heated inert material is such that the temperature of the gas is reduced to approximately 2000 degrees F., and wherein the step of cooling is sufficient to reduce the temperature of the sorbent material to a value that it cools the gas to approximately 1600 degrees F.

29. The method of claim 22 further comprising the steps of removing the inert material from the vessel, agitating the removed inert material to dislodge any desposits that adhere to the inert material and returning the inert material back to the vessel.

30. An apparatus for treating gas comprising:

a vessel having an upper and a lower portion, the lower portion for receiving a gravel bed;

first inlet means for introducing the gas into the gravel bed;

second inlet means for introducing particles into the vessel for cooling and reacting with gas, the particles being entrained in the upper portion by the gas;

a seperator connected to the vessel for receiving the gas and entrained particles and seperating the gas from the entrained particles; and a heat exchanger connecting the seperator to the vessel, for cooling the seperated particles and returning the cooled seperated particles to the vessel.

31. The apparatus of claim 30 further comprising means for heating the gravel so that the gases do not condense thereon.

32. The apparatus of claim 31 further comprising a regenerator located externally of the vessel and connected to the vessel for cycling the gravel between the regenerator and the vessel.

33. The apparatus of claim 32 wherein the regenerator comprises means for agitating the gravel in a mill to dislodge deposits adhering to the gravel, means for sorting and screening the gravel, and means for removing undesirable gravel.

34. The apparatus of claims 33 further comprising a bin of additional gravel and a duct connecting the bin to the vessel for transferring the additional gravel from the bin to the vessel to replace the removed gravel.

35. The apparatus of claim 30 Wherein the particles are a sorbent.

36. The apparatus of claim 30 wherein the particles are a sorbent for absorbing sulphur.

37. The apparatus of claim 30 wherein the separator is a cyclone separator located externally of the vessel.

38. The apparatus of claim 30 further comprising a bin of additional particles and a duct connecting the bin to the vessel for transferring the additional particles from the bin to the vessel.

39. The apparatus of claim 30 further comprising a pressure seal located between the vessel and the separator to prevent the backflow of the particles from the vessel to the separator.

40. The apparatus of claim 30 wherein the inside diameter of the upper portion is greater than the inside diameter of the lower portion.

\* \* \* \* \*

UNITED STATES PATENT AND TRADEMARK OFFICE
CERTIFICATE OF CORRECTION

PATENT NO. : 5,567,228                                                Page 1 of 2
DATED      : October 22, 1996
INVENTOR(S) : Iqbal F. Abdulally It is certified that error appears in the above-identified patent and that said Letters Patent is hereby corrected as shown below:

On the title pagem item [54],
<u>In the title</u>:

In the second line of the title, insert a space after "A" and before "HOT".

Column 1, line 2 of the title, insert a space after "A" and before "HOT".

Column 1, line 57, delete comma after the word "which".

Column 2, line 49, delete "EMBODIMENTS" and replace with --EMBODIMENT--.

<u>In the Claims</u>:

Claim 30, line 10, after "a", delete "seperator" and insert --separator--.

Claim 30, line 11, after "and" delete "seperating" and insert --separating--.

Claim 30, line 13, after "the" delete "seperator " and insert --separator--.

UNITED STATES PATENT AND TRADEMARK OFFICE
CERTIFICATE OF CORRECTION

PATENT NO. : 5,567,228
DATED : October 22, 1996
INVENTOR(S) : Iqbal F. Abdulally It is certified that error appears in the above-identified patent and that said Letters Patent is hereby corrected as shown below:

Claim 30, line 14. after "the" delete "seperated" and insert --separated--.

Claim 30, line 15, after "cooled" delete "seperated" and insert --separated--.

Signed and Sealed this

Third Day of March, 1998

*Attest:*

BRUCE LEHMAN

*Attesting Officer*     *Commissioner of Patents and Trademarks*